Jan. 29, 1935.  M. E. MOORE  1,989,525
LAWN SPRINKLER
Filed Aug. 25, 1934
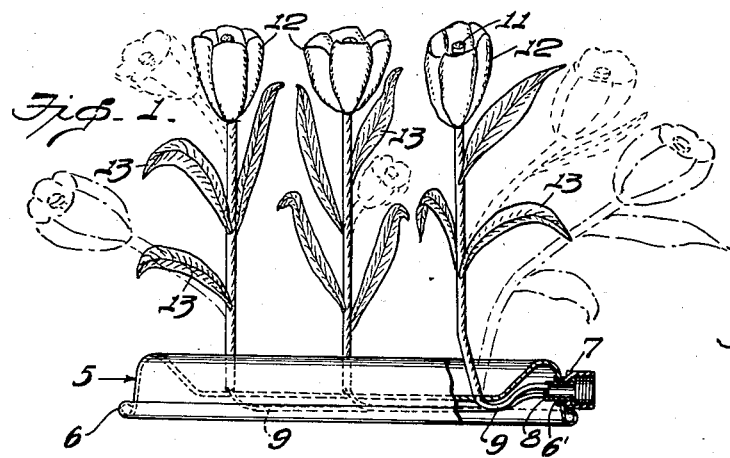
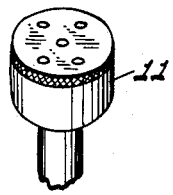
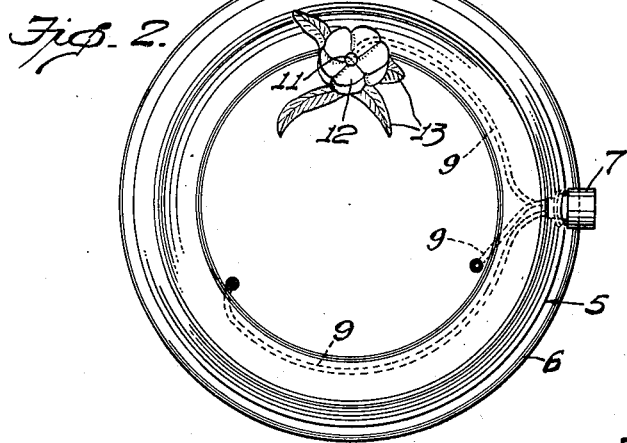
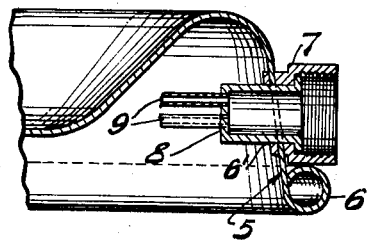
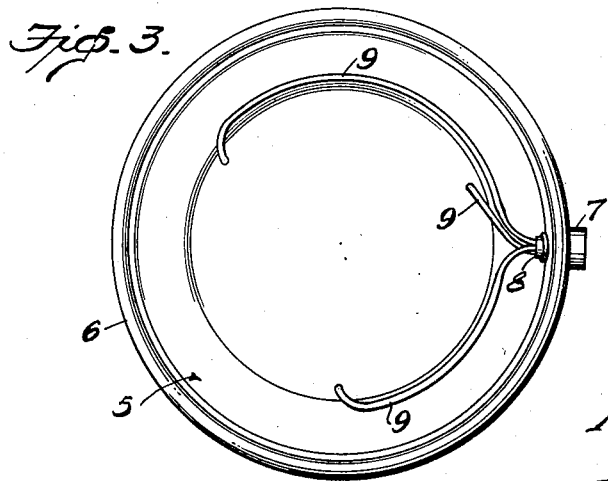
Inventor
MARY E. MOORE
By David Petty Moore
Attorney Patented Jan. 29, 1935

1,989,525

UNITED STATES PATENT OFFICE 1,989,525

LAWN SPRINKLER

Mary E. Moore, Avon Park, Fla.

Application August 25, 1934, Serial No. 741,477

2 Claims. (Cl. 299—57)

This invention relates to improvements in lawn sprinklers, one object of the invention being the provision of a light, easily movable about the lawn, simple, durable, inexpensive and ornamental device of this type, and one which can readily be attached to a hose for placement at desired points upon the lawn.

Another object of the invention is the provision of a lawn sprinkler having a plurality of bendable tubes or pipes led from a single hose coupling, and supported so that the pipes or tubes, each one of which carries a nozzle, may be presented in various "spreads" or angles to direct the sprayed water in relatively reduced or relatively enlarged areas, thus making it specially useful in small or larger lawns.

Still another object of this invention is the provision of a basin support for the tubes and nozzles, which may act as a bath for birds and which holds the sprinkler in a rigid position during the water pressure spraying.

In the accompanying drawing:—

Figure 1 is a side elevation of the complete device, dotted, dash and dot-and-dash lines showing several of the positions that the tubes are capable of assuming after being bent by hand.

Figure 2 is a top plan view of the device with several of the nozzle carrying tubes broken off.

Figure 3 is a bottom plan view thereof.

Figure 4 is a section through a portion of the pan adjacent the hose coupler.

Figure 5 is a perspective view of one of the nozzles used in my device.

Referring to the drawing, the numeral 5 designates the base, here shown as a circular metal pan having the rim 6, which acts as a support for the device. Mounted and supported in the opening 6' of the rim, is a hose coupler 7, to which a hose, not shown, may be attached. Soldered or otherwise attached to the inner end of the coupler and within the rim below the pan proper is a disk 8, to which is attached a plurality, here shown three, tubes or pipes 9. These tubes are made of a bendable metal such as malleable brass or copper, and are extended through openings 10 in the pan, where they are soldered to prevent any leakage at this point. These tubes are then extended upwardly and at each free end is attached a nozzle 11, having preferably five holes for spraying the water. These tubes as shown may assume the full line position, of Figure 1, or may be bent to assume the various dash and dot-and-dash line positions there shown. By this construction the nozzle may be caused to direct the spray in a relatively confined or a relatively large area of lawn.

The complete device being relatively light in weight may be pulled about the lawn through the medium of the hose and thus without turning off the water, the locale for spraying may be changed at will.

Where so desired to make the device more ornamental, the flower imitations 12 may be attached to the upper ends of the tubes, so that the nozzle of each appears to be the stamen of the flower, while along the stem may be attached imitations of leaves 13.

From the foregoing taken in connection with the drawing it is evident that the pan will receive a certain amount of the sprayed water and may constitute a bird bath.

What is claimed, is:—

1. A lawn sprinkler including a pan having an inverted rim, a hose coupler mounted in the rim thereof, and a plurality of nozzle carrying tubes carried by the pan and in communication with the coupler, said tubes being made of bendable metal so that they may be bent to assume various adjusted positions and to provide a selective directional multiple spray.

2. A lawn sprinkler, including a pan having an inverted supporting rim, a hose coupler supported in the rim with its hose connection exteriorly thereof, a plurality of bendable metallic tubes attached to the inner end of the coupler and in communication therewith, said tubes extending upwardly through the pan, and a spray nozzle in the free end of each tube, whereby the tubes may be bent relatively to each other to change the directional spraying of each individual tube.

MARY E. MOORE.